United States Patent [19]
Wagner et al.

[11] Patent Number: 5,590,749
[45] Date of Patent: Jan. 7, 1997

[54] ELECTRICAL CORD RETRACTION DEVICE

[75] Inventors: Ronald D. Wagner, Signal Hill; William L. Klima, Stafford, both of Calif.

[73] Assignee: Magic Electrical Products L.L.C., Stafford, Va.

[21] Appl. No.: 112,973

[22] Filed: Aug. 30, 1993

Related U.S. Application Data

[63] Continuation-in-part of Ser. No. 696,847, May 7, 1991, Pat. No. 5,241,593, which is a continuation-in-part of Ser. No. 493,233, Mar. 14, 1990, abandoned.

[51] Int. Cl.$^6$ ............................................. H02G 11/02
[52] U.S. Cl. .................................. 191/12.4; 379/438
[58] Field of Search ........................... 191/12.2 R, 12.4; 379/437, 438

[56] References Cited

U.S. PATENT DOCUMENTS

| | | | |
|---|---|---|---|
| 1,222,376 | 4/1917 | Ferguson | 191/12.2 R |
| 1,247,672 | 11/1917 | Hallberg | 191/12.2 R |
| 1,442,999 | 1/1923 | Boyle | 191/12.2 R X |
| 2,013,733 | 9/1935 | Murphy | 191/12.4 |
| 2,031,434 | 2/1936 | Stern et al. | 191/12.2 R |
| 2,647,960 | 8/1953 | Benjamin | 191/12.4 |
| 2,979,576 | 4/1961 | Huber | 191/12.4 |
| 3,056,863 | 10/1962 | Johnson | 191/12.4 |
| 3,705,962 | 12/1972 | Banister | 191/12.4 |
| 4,384,688 | 5/1983 | Smith | 191/12.2 R X |
| 4,485,278 | 11/1984 | Schaller et al. | 191/12.4 |
| 4,499,341 | 2/1985 | Boyd | 191/12.4 |
| 4,517,757 | 5/1985 | Asada et al. | 191/12.4 X |
| 4,940,859 | 7/1990 | Peterson | 191/12.4 |
| 4,946,010 | 8/1990 | DiBono | 191/12.2 R |
| 5,156,242 | 10/1992 | Ditzig | 191/12.4 X |

*Primary Examiner*—Karen B. Merritt
*Assistant Examiner*—Scott L. Lowe
*Attorney, Agent, or Firm*—Klima & Hopkins, P.C.

[57] ABSTRACT

An electrical cord retraction device including a spring biased reel contained within a housing, a retractable cord stored on the reel, and an electrical connector capable of accommodating relative rotation between the reel and housing. A preferred embodiment of the device includes an electrical connector comprising a set of printed circuit boards with one printed circuit board having concentric rings and the other printed circuit board having electrical contacts. Another embodiment of the device includes an electrical connector defined by a spiral electrical connector, in particular a spiral strip electrical connector. A preferred embodiment is a retractable telephone cord device mounted to or part of a telephone base receiver unit, and/or a handset or headset.

28 Claims, 7 Drawing Sheets

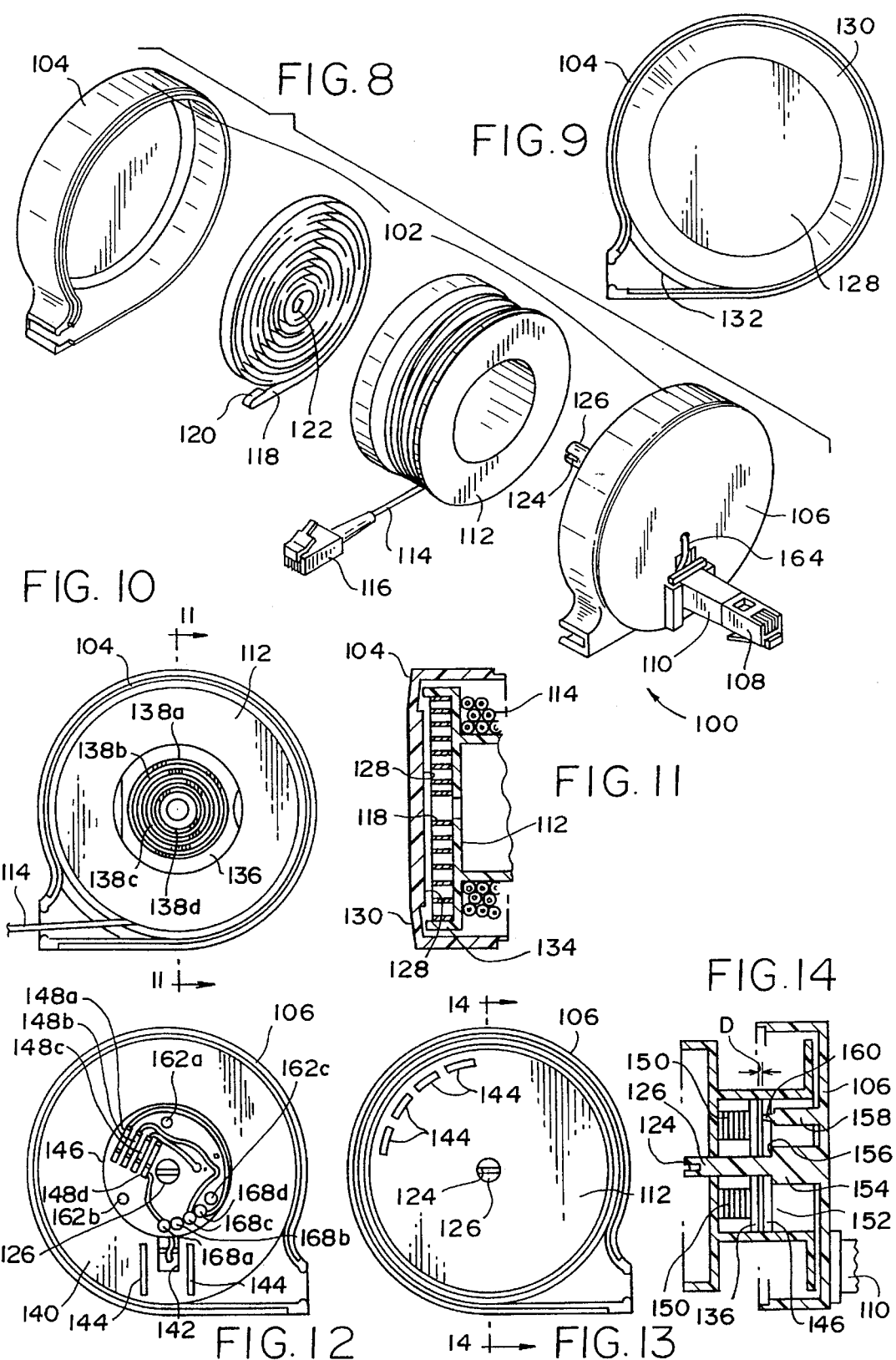

ELECTRICAL CORD RETRACTION DEVICE

RELATED APPLICATIONS

This is a Continuation-In-Part of Ser. No. 07/696,847 filed on May 7, 1991, entitled "TELEPHONE AND TELEPHONE CORD RETRACTION DEVICE, AND METHOD OF MAKING" and issued as U.S. Pat. No. 5,241,593 on Aug. 31, 1993 incorporated by reference herein, which was a Continuation-In-Part application of Ser. No. 07/493,233 filed on Mar. 14, 1990 entitled "TELEPHONE RETRACTABLE HANDSET CORD", now abandoned.

BACKGROUND OF THE INVENTION

1. Field of the Invention

This invention relates to a retractable electric cord device, and method of making the complete device and one or more components thereof. The device can be used for delivering power and/or information (e.g. data transmission for telephone, computer, printer, robotic, and other applications and appliances.

2. Prior Art

Conventional telephones are provided with a base unit connected to a handset by means of a cord formed in a coiled manner. With use, the cord of this type becomes tangled and unsightly due to twisting of the handset relative to the base unit a number of times over a period of time. After being sufficiently tangled or twisted, the telephone cord of this type becomes substantially unusable since the effective length of the cord is substantially reduced so that it is difficult for a user to remove the handset a sufficient distance from the base unit to use the telephone.

A new product has been recently marketed that can be referred to as a swivel connector. The swivel connector includes a male terminal that can be received within the female terminal of the handset, and the male terminal is pivotally connected to a female terminal that can receive the male end of a conventional coiled type telephone cord. The swivel connector allows the handset to be rotated freely about the base unit without tangling or twisting the conventional telephone cord. This prior art device is only relevant as a product that competes in the same market as the device according to the present invention, but is totally unrelated in structure or function.

U.S. Pat. No. 4,940,859 discloses a telephone cord take-up reel assembly comprising a housing with a take-up reel having a predetermined length of telephone cord. This assembly utilizes a slip ring connector to accommodate relative rotation between the housing and take-up reel. The slip ring connector is not desirable, since such a connector produces signal noise that may not be suitable for many applications such as electrical information transfer.

U.S. Pat. No. 4,499,341 discloses an extensible electrical cable assembly comprising a housing in combination with a resiliently stressable flat cable. The cable is provided with electrical connectors at its ends, and is wrapped in a coil around a hub in the housing. The assembly is used to provide electrical power to reciprocally moving parts including robots, typewriters, and computer printers. This assembly is unlike the present invention since it does not include a reel for winding and storing an electrical extension cord, nor a spiral electrical connector for electrically connecting the electrical extension cord to an electrical connector extending through the housing, nor a spring for winding the reel as in the present invention.

SUMMARY OF THE INVENTION

Accordingly, it is a primary object of the present invention to provide an improved electrical retractable cord device for power and/or information transmission between electrical devices and/or components.

Another object of the present invention is to provide an electrical retractable cord device that can be made compact and generates little or no signal noise during operation due to the use of an electrical spiral connector in one embodiment and circuit board type connector in another embodiment.

A further object of the present invention is to provide a retractable cord device that is durable and can withstand high operational use.

An even further object of the present invention is to provide a retractable cord device with a unique construction that reduces the number of components for assembly.

These and an other objects can be achieved by the device according to the present invention. The device can be used for many different applications such as a telephone cord retraction device located between a handset or headset and a base unit of a telephone and/or between the base unit and conventional wall telephone terminal. Further, the device can replace the standard coiled cable located between a keyboard and computer to allow the keyboard to be moved towards or away from the stationary computer. The device can replace the standard cable between a microphone handset and receiver/transmitter unit. The device can be used for robotics application or any other machinery where a power connection and/or information transmission is required between moving parts. In particular, the device can be configured to function as a retractable power extension cord for household appliances and/or commercial machinery.

The device can be made very compact in size since all components lend themselves to miniaturization. Further, the spring tension applied on the retractable electrical cord can be tailored for the particular application by changing the construction of the electrical spiral connector, by changing the construction of the spring, adding one or more additional spring components, and/or a combination of these changes.

The device is constructed with a housing having a reel rotatably mounted therein. The retractable cord is at least partially stored on the reel and passes through an opening in the housing. The retractable cord can be withdrawn from the housing by pulling on the retractable electrical cord. Thus, the retractable cord must be constructed to withstand a sufficient tension load to allow the retractable electrical cord be withdrawn from the housing without breaking.

A power extension cord embodiment of the device according to the present invention electrically connects one electrical component or device to another electrical component or device. The retractable electrical cord can be supplied with an electrical connector to allow easy connection or disconnection with a first electrical component, or can be directly connected to the first electrical component such as by a soldering connection. The device is provided with an electrical connector that extends through the housing and allows the device to be electrically connected to a second electrical component. The housing electrical connector can be constructed to allow easy connection or disconnection with the second electrical component, or can be directly connected to the second electrical component by a soldering connection. The housing electrical connector, for example, can be in the form of a flexible or rigid wire assembly made with one or more wire conductors and provided with an electrical connector or directly wired into the second electrical component. Alternatively, an inner end of the spiral electrical connector or circuit board type connector, both to be discussed in detail below, can be electrically connected in some manner through the housing, and connected to the second electrical component. In the spiral spring electrical connector embodiment, the inner end of the spiral electrical connector serves as the housing electrical connector.

The housing electrical connector preferably extends through the side of the housing approximately at the center, since a connection must be made between the retractable electrical cord and the housing electrical connector. However, other types of electrical connectors and manners of electrically connecting the retractable electrical cord to the second electrical component can be substituted for this preferred arrangement.

The reel is provided with a cavity for receiving the spiral electrical connector in one embodiment, or the circuit board type connector in another embodiment, to provide a space saving arrangement. The spiral electrical connector or circuit board type connector allow relative rotation between the reel and the housing of the device while electrically connecting the retractable electrical cord with the housing electrical connector. The spiral electrical connector can be made to have a spring effect to provide at least a portion of the retraction force on the reel for winding the retractable electrical cord onto the reel. Alternatively, the spiral electrical connector is made with no spring effect and one or more additional springs are provided for the purposes of supplying the necessary retraction force on the reel. Preferably, the spiral electrical connector is a spiral spring electrical connector providing the duel functions of both serving as an electrical connector and serving as a spring for retracting the retractable electrical cord on the reel in combination with another spring to add additional retraction force to the assembly. In the embodiment with a circuit board type connector, a separate spiral spring is required to wind the reel, since the circuit board type connect serves the single function of providing an electrical connection between the moving retractable electrical cord and stationary housing electrical connector.

Through development, it has been discovered that a spiral spring electrical connector produced with mostly copper wires does not provide a sufficient desirable retraction force for some applications to ensure full retraction of the cord into the housing and reliable retraction into the housing during every winding operation. Thus, the addition of one or more spring components is preferred or even required in certain applications requiring strong retraction forces. The one or more additional spring components can be a separate component such as a separate metal spiral spring, or can be incorporated into the spiral spring electrical connector as an integral component thereof.

The present invention can be embodied as a retractable telephone cord device to be positioned between the handset and base unit of a conventional telephone. Preferably, the telephone retractable cord device includes a male telephone terminal which is received within the standard female terminal of the conventional base unit with the retractable telephone cord being provided with a male connector to be received within the standard female terminal of the conventional handset. Alternatively, the telephone retractable cord device according to the present invention can be constructed to connect into the standard female terminal on a conventional handset with the retractable telephone cord connecting into the base unit.

Further, the telephone retractable cord device according to the present invention can be incorporated into what would otherwise be a conventional telephone having a handset and base unit. Specifically, the telephone retractable cord device according to the present invention can be incorporated into a conventional handset and/or conventional base unit of a conventional telephone, or both. Preferably, the telephone retractable cord device according to the present invention would be incorporated into the base unit of a telephone constructed as a single unit, for example, where the housing of the telephone retractable cord device would be molded as a single unit with the outer cover of the base unit. In any event, the present invention covers all telephone retractable cord devices of similar construction positioned between the handset and base unit of a telephone, or between the base unit and conventional wall terminal.

Further, this invention relates to a particular construction of a retractable electrical cord for application with the electrical retractable cord device according to the present invention. This retractable electrical cord is of a special construction according to the present invention to miniaturize the device, eliminate noise signals, prevent a power drop between the first and second electrical components connected by the device, and to provide sufficient strength and durability to withstand winding and long hard use.

In the telephone application, the device is preferably made as compact as possible while being limited to size reduction due to the space requirement of a certain length of wire having a particular cross-sectional dimension when wound up. In order to make the device compact, conventional gage telephone cord could not be utilized in the most desirable telephone application due to its relatively large size. Preferably, a telephone cord retraction device according to the present invention is constructed with an unconventional specially made small gage retractable telephone cord according to the present invention to accomplish its function of providing a retractable telephone cord between the base unit and handset of a telephone. Specifically, an unconventional and unavailable telephone cord is used in a preferred embodiment of the present invention to achieve the compact dimensions required to enable it to be feasibly positioned between the base unit and handset of a telephone. This same cord has been tested and is suitable for conventional power transmission without further modification.

One embodiment of the cord is constructed of four (4) insulated wires, and each wire is made of seven (7) stainless steel strands with the seventh strand copper plated. Alternatively, all seven (7) strands are copper plated.

Further, the spiral spring electrical connector according to one embodiment of the present invention is unconventional and presently unavailable for use in preferred embodiments of the device in certain applications where space requirements are important.

The basic structure of a preferred embodiment of the cord retraction device according to the present invention includes a reel mounted within a housing of the device. In the assembled device, the retractable cord is wound around the reel and stored until used. The retractable cord is accommodated through an opening in the housing through which the retractable cord is repeatedly extended and retracted during and after each use. The device includes a spiral spring for providing the retraction force for rotating the reel to retract the extended telephone cord back into the housing. Preferably, in one embodiment the spiral spring is a spiral spring telephone connector defined by a strip connector assembly wound in a spiral spring in such a manner, or constructed, to act or provide a retraction force upon winding and acting as a spiral spring.

Preferably, the spiral spring telephone connector is constructed of separate electrically conducting wires set apart a distance and parallel to each other within the strip connector assembly, preferably made of an insulating plastic material. More preferably, one of the four electrical wire conductors is made of stainless steel, and the remaining three conductors are made of copper plated stainless steel to reduce the noise level resulting from the use of the connector in the communication linkage.

The spiral spring telephone connector utilized in the one preferred embodiment of the telephone retractable cord device is mounted within the housing. Preferably, the spiral spring telephone connector is mounted within a cavity in the reel to make the device more compact. Alternatively, a separate spiral spring can be positioned in or along one or both sides of the reel in another embodiment of the device to augment the spiral spring telephone connector. In the most preferred embodiment, the reel of the device is provided with a cavity for receiving a spiral spring in the format of a spiral spring telephone connector as discussed in detail above. One end of the spiral spring connector is connected to a telephone terminal associated with the housing of the device and an opposite end of the spiral spring telephone connector passes through an opening in the reel, and is connected to the retractable telephone cord.

The reel of the device is rotatably mounted within the housing. For example, the housing can be provided with a hub received within a cavity of the reel. The hub centers and maintains the position of the reel within the housing during rotation of the reel within the housing°

BRIEF DESCRIPTION OF THE DRAWINGS

FIG. 8 is a broken apart view of another preferred embodiment of the present invention incorporation a circuit board connector.

FIG. 9 is an elevational side view of the inside construction of one housing side with the reel removed.

FIG. 10 is an elevational side view of the inside construction of the device with the reel installed.

FIG. 11 is a cross-sectional view of the housing side as indicated in FIG. 10;

FIG. 12 is an elevational side view of the inside construction of an opposite housing side with the reel removed and circuit board installed.

FIG. 13 is an elevational side view of the inside construction of the device with the reel installed.

FIG. 14 is a cross-sectional view of the housing side as indicated in FIG. 13.

DETAILED DESCRIPTION OF PREFERRED EMBODIMENTS

Figure 1:
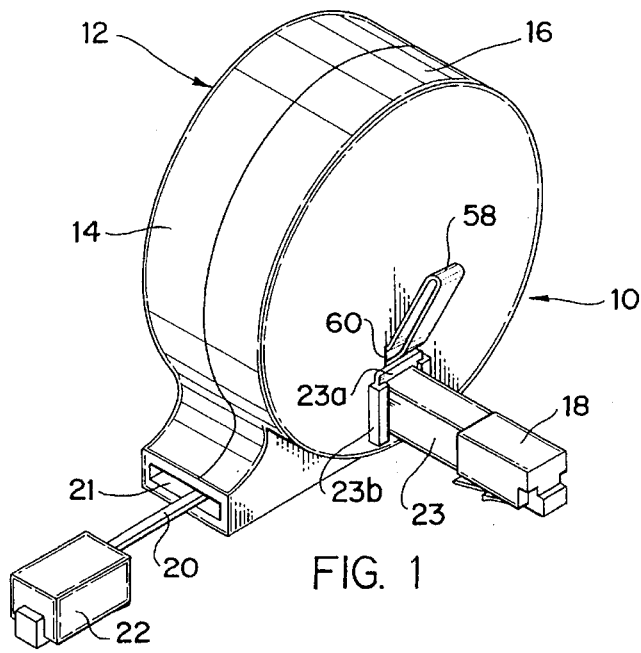
FIG. 1 is a perspective view of a retractable electrical cord device according to the present invention.

An embodiment of the retractable electrical cord device 10 according to the present invention is shown in FIG. 1. The retractable electrical cord device 10 illustrated in FIG. 1 is for a telephone application, and will be referred to hereinafter as a retractable telephone cord device 10.

The retractable telephone cord device 10 includes a housing 12 constructed of sides 14 and 16 joined together. The housing 12 is preferably made of injection molded plastic. A male telephone connector terminal 18 is mounted on the side 16 of the housing 12 and projects outwardly therefrom. Alternatively, the terminal 18 can be separate from the housing 12. The male telephone connector terminal 18 can be a conventional telephone connector, or a custom designed one for a particular application. The housing 12 is provided with an opening 21 for accommodating a retractable telephone cord 20 extending through the housing 12. The retractable telephone cord 20 is provided with a male telephone connector terminal 22. The male telephone connector terminal 22 can be a conventional telephone connector, or a custom designed one for a particular application. In a preferred embodiment, the side 16 of the housing 12 is provided with a repositionable extension 23 from which the male telephone connector terminal 22 is support thereon. The base of the extension is provided with ears 23a, which cooperate with gripping portions 23b provided on the side 16 of the housing 12. More specifically, a set of ears 23a of the extension 23 can slide into the gripping portions 23b of the side 16 of the housing 12 for securing the extension 23 to the housing 12. The extension 23 can be made with a square-shaped cross section, and provided with an ear 23a on each of the four (4) sides thereof. The extension 23 can be rotated in ninety degree (90°) increments relative to the housing 12 by sliding the ears 23a of the extension 23 from the gripping portions 23b to disengage the extension 23 from the housing 12. The extension 23 is rotated to the desired angle set at ninety degree (90°) increment, and the extension 23 is again connected to the housing 12 by sliding a pair of opposite ears 23a into the gripping portion 23b. This feature allows the device 10 to be mounted on a variety of conventional telephone base units, no matter what the orientation of the base unit (i.e. desk top or wall installation). Preferably, the extension 23 is made of injection molded plastic with the ears 23a molded extensions thereof.

Figure 2:
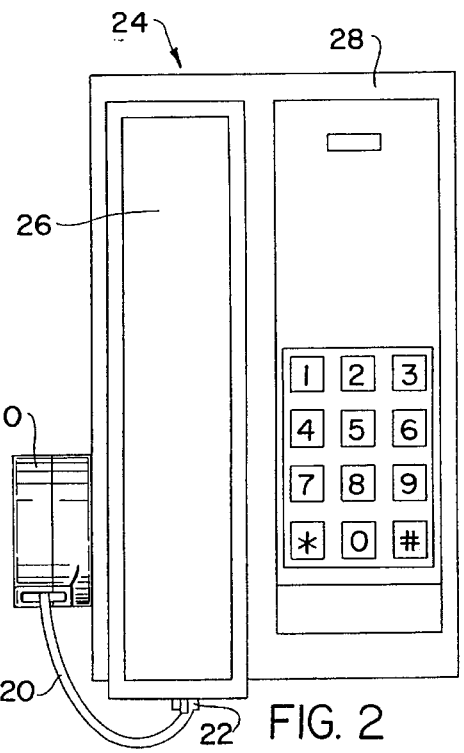
FIG. 2 is a top elevational view of a telephone provided with a telephone retractable cord device according to the present invention.

A conventional telephone 24 including a handset 26, base unit 28 and keyboard 30 is provided with the telephone retractable cord device 10 according to the present invention, as shown in FIG. 2. The telephone retractable cord device 10 can be integrated into the conventional telephone rather than being a separate attachable unit. For example, the housing of the telephone retractable cord device can be molded as a single piece with the housing of the base unit.

Figure 3:
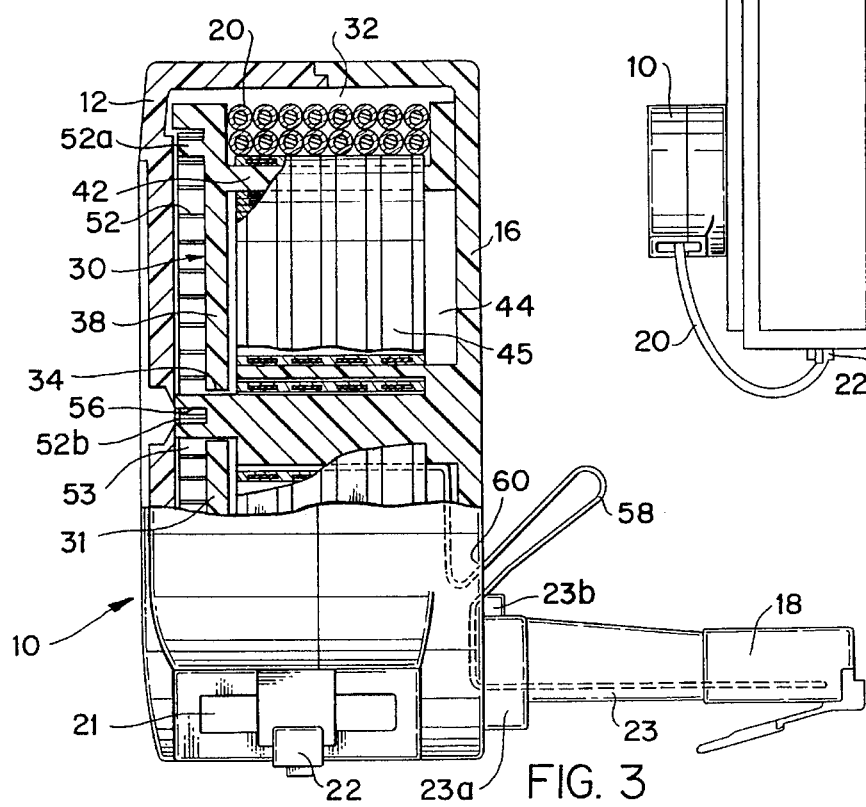
FIG. 3 is a cross-sectional view through the width of the retractable electrical cord device shown in FIG. 1, with a portion broken away.

A detailed cross-sectional view across the width of the retractable telephone cord device 10 is shown in FIG. 3. A reel 30 is rotatably disposed within the housing 12. Specifically, the reel 30 is mounted in a cavity 32 of the housing 12. The reel 30 is provided with a side 31 having a hole 34, which receives a hub 36 extending inwardly from side 16 of the housing 12. The hub 36 provides a pivotal axis for rotation of the reel 30 thereon.

The reel 30 is provided with a spool wall 42, preferably circular in shape. The spool wall 42 of the reel 30 defines a cavity 44, which the hub 36 extends through the center thereof. A spiral electrical or telephone connector 46 is disposed within the cavity 44.

Figure 4:
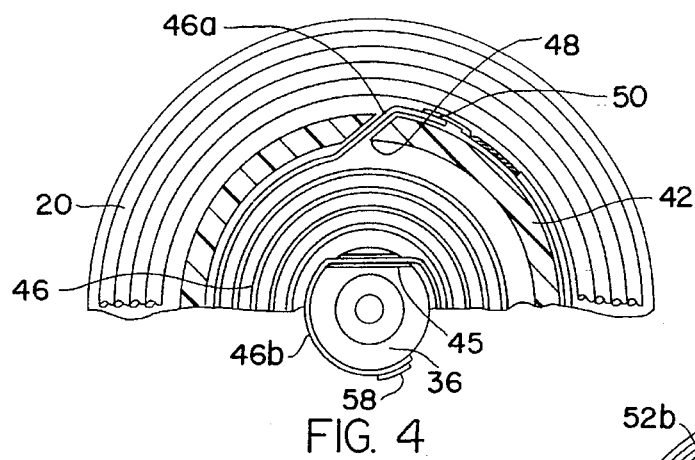
FIG. 4 is a side cross-sectional side view of the reel of the device, as shown in FIG. 3.

An outer end 46a of the spiral spring telephone connector 46 passes through an opening 48 in the spool wall 42, and electrically connects to the retractable telephone cord 20 at electrical connection 50, as shown in FIG. 4. For example, the end of the separate conductors of spiral telephone connector 46 can be soldered, as shown, to the ends of the separate wires of the retractable telephone cord 20. An inner end 46b of the spiral telephone connector 46 fits into a slot 45 in the hub 36 to anchor the inner end 46b from movement within the housing 12 during a winding operation, as shown in FIG. 4. The spiral telephone connector 46 may be made to have a spring effect to provide at least a portion of the retraction force for winding the telephone cord 20 onto the reel 30. In this embodiment, the spiral telephone connector 46 can be characterized as a spiral spring telephone connector.

Figure 5:
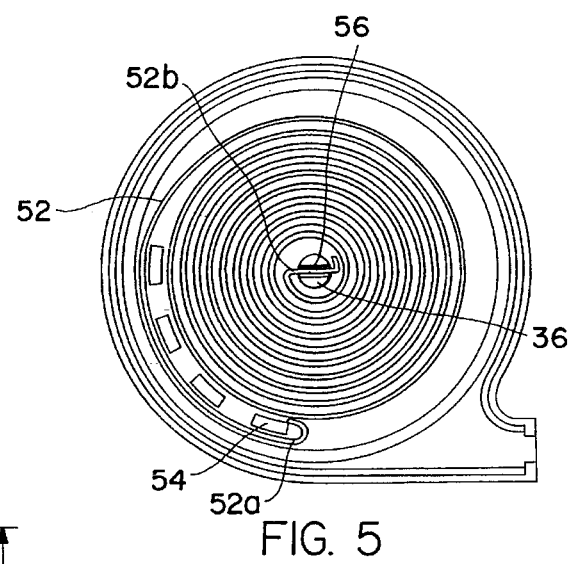
FIG. 5 is a broken away side elevational view of the device with half of the housing removed to expose the arrangement of the spiral spring.

A separate spiral spring 52 is provided in an additional cavity 53 of the reel 30, as shown in FIGS. 2 and 5. The spiral spring 52 can be made of spring steel having a spiral spring configuration. Alternatively, other types of springs arrangement can be substituted. The spiral spring 52 includes a bent outer end 52a anchored to a post 54 extending from the side wall 38 of the reel 30, and an inner end 52b anchored in a slot 56 of the hub 36.

The cavity 53 is positioned on the opposite side of side wall 38 from cavity 44 containing the spiral telephone connector 46. This construction isolates the separate spiral spring 52 from the spiral telephone connector 46 to prevent contact and mechanical interference with each other, since these parts move to a certain extent during operation. Alternatively, the spiral spring 52 can be made integral with the spiral telephone connector 46 eliminating the need for the additional cavity 53.

The spiral telephone connector 46 is shown in FIG. 3 in an unwound mode with spaces existing between adjacent turns thereof. Upon rotating of the reel 30 during retraction of the telephone cord 20, the spiral spring telephone connector 46 becomes tightly wound with adjacent turns thereof coming into contact with each other.

An electrical connector 58 is electrically connected to an inner end of the spiral telephone connector 46, and extends through the housing 12, for example, through an opening 60, as shown in FIG. 1. In the embodiment shown in FIG. 1, the electrical connector 58 is a strip electrical connector assembly, which extends through the extension 23 and electrically connects the spiral telephone connector 46 to the telephone terminal 18.

Figure 6:
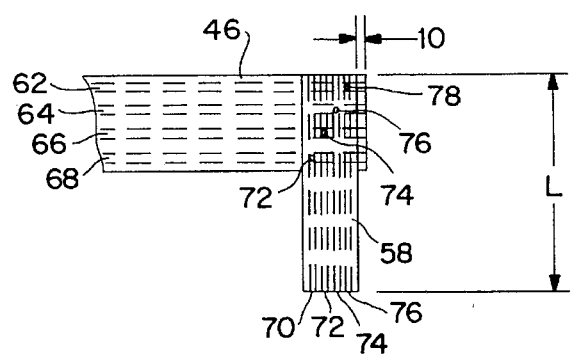
FIG. 6 is a detailed view of the spiral electrical connector according to one embodiment of the present invention illustrating the connection with an electrical connector.

An embodiment of the spiral telephone connector 46 according to the present invention is shown in FIG. 6. The spiral telephone connector 46 is constructed of four (4) copper wire conductors 62, 64, 66 and 68. The wire conductors 62, 64, 66 and 68 can be made from a flat sheet of copper of 0.062 inch in width and 3 mils (1/1000 inch) in thickness. The wire conductors are arranged parallel side-by-side and spaced apart with a spacing of 100 mils on center, and then laminated between two (2) pieces of Mylar of 2 mils thickness with a hot glue adhesive sprayed on the inside surfaces of the Mylar prior to the lamination step. To this assembly a laminating pressure is applied which causes the copper wires to adhere to the Mylar, which in the assembly acts as an insulator. The completed assembly, for example, would have a length of four (4) feet, four (4) inches.

To create the spiral spring telephone connector's coiling ability, the above-described assembly is coiled around a 5/16 inch mandrel and placed in a heated oven at 200 degrees F, + or −10 degrees F, for 1.5 hours.

The electrical connector 58 is likewise constructed of four (4) wire conductors 70, 72, 74 and 76, as shown in FIG. 6. For example, the electrical connector 58 is made of four (4) flat copper wires of 0.25 inch width and 2 mils in thickness. The flat coppers wires are arrange parallel side-by-side and set apart, and then laminated under pressure between two (2) glued pieces of Mylar of 2 mils thickness. The length of this assembly would be four (4) inches by way of example.

The spiral telephone connector 46 is electrically connected to the electrical connector 58 at connections 78, 80, 82 and 84. The electrical conductor 58 is positioned at approximately ninety degrees (90°) with respect of the lengthwise direction of the spiral telephone connector 46. The spiral telephone connector 46 and electrical connector 58 are connected together, for example, by a process known as "tweezer welding." A tweezer welder utilizing low current A.C. is implemented to weld through the Mylar, in the above-described assemblies, to affix the thin flat copper wire conductors of the spiral telephone connector 46 and electrical connector 58 together.

Figure 7:
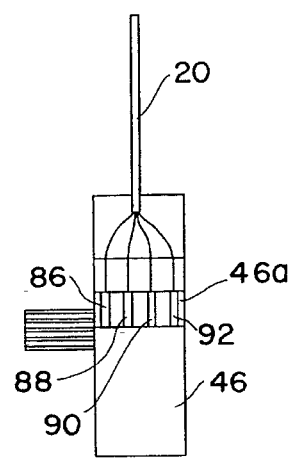
FIG. 7 is a detailed view of the electrical connection between the retractable cord and spiral electrical connector.

The outer end 46a of the spiral spring telephone connector 46 is connected to the telephone cord 20, as shown in FIG. 7. The four (4) telephone wires 62, 64, 66 and 64 of the spiral spring telephone connector 46 are connected to the four (4) telephone wires 86, 88, 90 and 92 of the retractable telephone cord 20. An opposite end of the retractable telephone cord 20 is connected to the male telephone connector terminal 22 as shown in FIG. 1, for example, by tweezer welding. During assembly, for example, the outer end 46a of the spiral telephone connector 46 is connected to the telephone cord 20 after the step of connecting the spiral telephone connector 46 to the electrical connector 58.

By way of example, the retractable telephone cord 20 is made with four (4) wires. Three (3) of the four (4) wires are made of seven (7) strands of 38 gage stainless steel wire copper plated for enhanced noise listening clarity. The fourth wire is made of seven (7) strands of 38 gage stainless steel wire, not copper plated like the other three wires, for added strength. This is particularly important due to the small gauge of the overall wire and the requirements of compact size and sufficient strength to endure typical use of with a telephone handset.

The wire thickness of each of the four (4) wires is 12,000 mils. The insulation (ABS type) of each of the four (4) wires is 3,000 mils in thickness with the total outside diameter of each assembled wire conductor being 18,000 mils. The four (4) wires are twisted together with a combined total outside diameter of 72,000 mils. This assembly is again provided with a sleeve of 3,000 mils thickness (ABS type) insulation to form the completed assembly. The total length of the retractable telephone cord is seventy-six (76) inches.

OPERATION OF THE RETRACTABLE TELEPHONE CORD DEVICE

The device 10 is mounted on a conventional telephone by replacing the conventional coiled shaped cord with the device according to the present invention. Specifically, the telephone terminal 18 is plugged within the standard female receptacle terminal on the base unit 28, and provides both an electrical and structural connection therewith. The telephone terminal 22 of the retractable cord 20 is then inserted within the standard female receptacle terminal of the handset 26. During use, after an incoming call is received, a user grabs the handset 46 and pulls the retractable telephone cord 20 out of the housing 12 of the device 10. The length of the cord 20 can be changed during the telephone conversation by simply moving the handset away or towards the base unit 28. After the conversation is completed the handset 26 is returned to the base unit 28 with retractable telephone cord 20 automatically retracting within the housing 12 of the device 10. In the embodiment shown in FIG. 2 (i.e. desk top type telephone), the base unit 28 can be secured to the support surface it is sitting on in some suitable manner to prevent movement thereof during retraction of the telephone cord. For example, a velcro fastener with stick back component can be adhered to both the support surface and base unit 28 to provide detachable connection therebetween.

EMBODIMENT WITH CIRCUIT BOARD CONNECTOR

Another embodiment of a device 100 according to the present invention is shown in FIG. 8. The device 100 comprises a housing 102 constructed of sides 104 and 106 that are joined together in the fully constructed assembly. The side 106 is provided with a male electrical connector 108 mounted on an extension 110. The male electrical connector 108 can be a conventional telephone terminal connector, and/or can be a conventional or specially constructed type of electrical connector depending on the application. The present invention proposes utilizing conventional telephone terminal connectors for both telephone and electrical power transmission applications (i.e. using a conventional telephone terminal connector in an unconventional manner for power transmission). The extension 110 can be repositionable as discussed in detail in the above embodiment.

A reel 112 is rotatably disposed within the housing 102 in the assembled unit. A retractable electrical cord 114 is wound around the reel 112, and provided with a male electrical connector 116 at the end thereof. A spiral spring 118 is provided between the reel 112 and housing side 104 for providing reeling force to the reel 112 during retraction of the cord 114. Specifically, the spiral spring 118 is provided with an outer connector end 120 with means for anchoring to the reel 112 (e.g. bent end). The spiral spring 118 is also provided with an inner connector end 122 anchored to an axle 124 of housing side 106. The axle 124 is provided with a slot 126 for anchoring the inner connector end 122 of the spiral spring 118.

The device 100 shown in FIG. 8 is assembled by placing the reel 112 rotatably on the axle 124, and then compressing the spiral spring 118 followed by anchoring the outer connector end 120 to the reel 112, and anchoring the inner connector end 122 to the slot 126 of the axle 124.

An inner side view of the housing side 104 is shown in FIG. 9. A circular plane surface 128 is centered within the housing side 104, which loosely contacts with one side of the spiral spring 118 in the assembled unit. A circular webb portion 132 is provided to add strength and guide the retractable electrical cord 114.

An outer peripheral edge 134 of the reel 112 contains the spiral spring 118 within the reel 112, as shown in FIG. 11. The peripheral edge 134 is received within the annular recess 130 of the housing side 104 to contain the spiral spring 118 between the reel 112 and circular plane surface 128 of the housing side 104.

The reel 122 is provided with a circular circuit board 136 having electrically conductive rings 138a,b,c,d. The electrically conductive rings 138a,b,c,d are electrically connected on the back side of the circuit board 136 to the retractable cord 114.

An inner side view of the housing side 106 is shown in FIG. 12. The inside of the housing side 106 is mainly defined by a circular planar surface 140. The surface 140 is provided with a through hole 142 and indents 144 resulting from the molding process for forming the ears that hold the extension 110 onto the housing side 106.

A circular circuit board 146 is supported above the circular planar surface 140 by axle 126. The circular circuit board 146 is provided with electrical contacts 148 a,b,c,d, which electrically contact with electrically conductive rings 138a,b,c,d, respectively. Details of the circular circuit boards 136 and 146 will be discussed in detail below. The circular circuit board 146 is received within a cylindrical space in the reel 112 to make electrical contact with the circular circuit board 136. This arrangement will be discussed below.

A side view of the reel 112 disposed within the housing side 106 is shown in FIG. 13. The reel 112 is provided with a plurality of protrusions 148 for anchoring the outer connector end 120 of the spiral spring 118. Specifically, the end of the spiral spring is held between the protrusions 148 and the inner surface of the peripheral edge 134 of the reel 112 with the outer connector end 120 connected to the lowermost protrusion 148 shown in FIG. 13.

The circular circuit board 136 having electrical conductive rings 138 a,b,c,d is securely mounted within the reel 112 to prevent relative rotation between the circular circuit board 136 and reel 112, as shown in FIG. 14. A plurality of spacers 150 are molded inside cylindrical cavity 152 of the reel 112 for supporting the circular circuit board 136, and to limit the depth that the circular circuit board 136 can be installed inside the cylindrical cavity 152. The spacers 150 position the circular circuit board 136 precisely adjacent circular circuit board 146 to maintain a predetermined fix distance D between the circular circuit boards 136 and 146, and to allow the circular circuit board 136 to move relative to the stationary circular circuit board 146 when winding.

Figure 16:
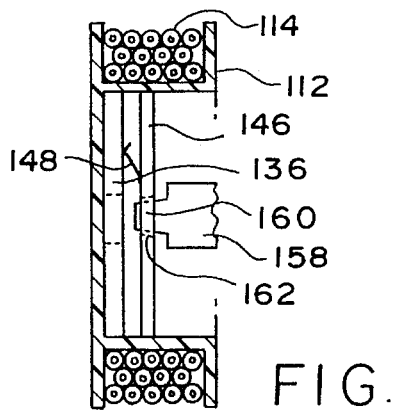
FIG. 16 is a top partial cross-sectional view of the reel showing the position of adjacent circuit boards of the circuit board connector.

The circular circuit board 146 is supported by the axle 126, which includes an enlarged standoff portion 154 for positioning the circular circuit board 146 from the housing side 106. Specifically, the enlarged standoff portion 154 provides a supporting edge 156 on which the circular circuit board 146 is placed against during assembly. An additional standoff 158 having a tapered projection 160, as shown in FIGS. 14 and 16, is provided for again supporting the circular circuit board 146 a pre-determined distance from the housing side 106 and for preventing the rotation of the circular board 146 relative to the housing side 106. Specifically, the tapered projection 160 is received within a through hole 162 in the circular circuit board 146 as shown in FIGS. 12 and 16.

In the embodiment shown, only a single additional standoff 158 having a tapered projection 160 is provided. However, one (1) or two (2) additional standoffs the same as or similar to the additional standoff 158 may be provided to further support the circular circuit board 146 and prevent its rotation relative to the housing side 106. As shown in FIG. 12, two (2) additional through holes 162 are provided to accommodate two (2) such additional standoffs.

Figure 15:
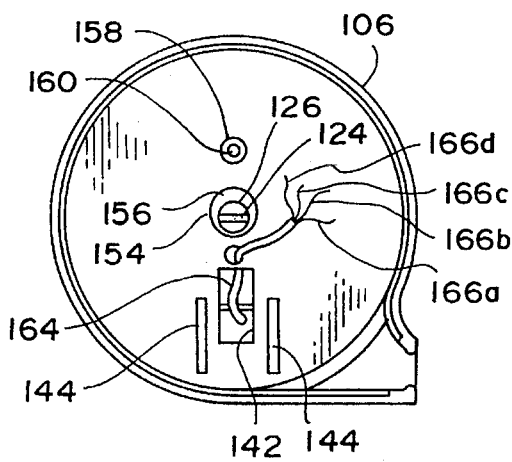
FIG. 15 is an elevational side view of the inside construction of the opposite housing side with the reel and circuit board removed.

An electrical cord 164 connects the male electrical terminal connection 108 to the circular circuit board 146, as shown in FIGS. 8, 12 and 15. The electrical cord 164 comprises four (4) separate electrically insulated wires 166a,b,c,d for connecting to the eyelet terminals 168a,b,c,d, as shown in FIGS. 12 and 15. Specifically, the ends of the electrically insulated wires 166a,b,c,d are soldered into eyelet terminals 168a,b,c,d on the back of the circular circuit board 146.

Figure 17:
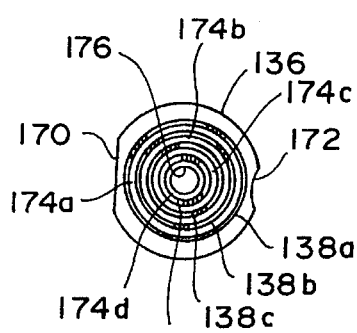
FIG. 17 is a side elevational view of the circuit board having four (4) ring conductors.
Figure 18:
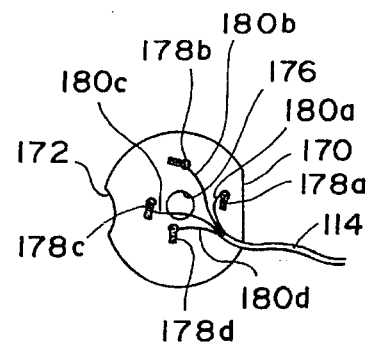
FIG. 18 is an opposite side elevational view of the circuit board shown in FIG. 17 displaying the terminal connectors.

A detailed view of the sides of the circular circuit board 136 is shown in FIGS. 17 and 18, respectively. The front side of the circular circuit board is provided with the four (4) electrically conductive rings 138a,b,c,d. The electrically conductive rings 138a,b,c,d can be incorporated into the circular circuit board 136 in various manners and techniques. Presently, the electrically conductive rings 138a,b, c,d are provided by electrolytic deposition of one or more layers of conductive materials using a masking technique. In a preferred embodiment, a layer of nickel is deposited followed by a layer of gold deposited over the nickel layer. The gold layer provides high wear characteristics and minimizes static or noise in the signal. Further, these conductors are suitable for transferring conventional household AC power of 110 or 115 volts without breakdown or failure. The circular circuit board 136 is provided with a straight edge 170 and a concave edge 172 to facilitate handling and assembly.

The circular circuit board 136 is provided with four (4) terminals 174a,b,c,d at 90 degree (90°) increments relative to each other. The terminals 174a,b,c,d are electrically conductive posts that extend through the thickness of the circular circuit board 136, and electrically connect the electrically conductive rings 138a,b,c,d to the back of the circular circuit board 136 for connection with the four (4) electrically insulated wires of the retractable electrical cord 114. Further, the electrically conductive posts prevent the electrically conductive rings 138a,b,c,d from rotating or attempting to rotate on the front face of the circular circuit board 136 during rotation. A through hole 176 is provided at the center of the circuit board 136 for accommodating the axle 124, and to allow relative rotation of the circuit board 136 relative to the axle 124.

The posts of the terminals 174a,b,c,d connect the electrically conductive rings 138a,b,c,d to terminals 178a,b,c,d on the back of the circuit board 136, as shown in FIG. 18. The retractable cord 114 includes four (4) electrically insulated wires 180a,b,c,d, which are soldered to the terminals 178a, b,c,d.

Figure 19:
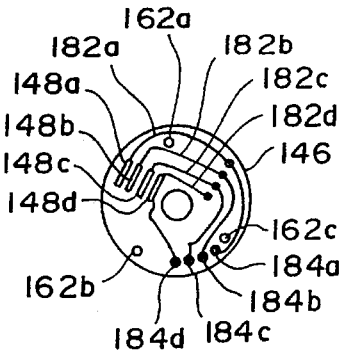
FIG. 19 is a side elevational view of an embodiment of the circuit board having one (1) set of brush contacts.
Figure 20:
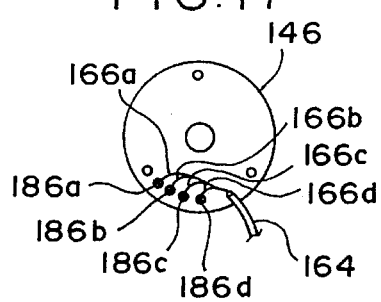
FIG. 20 is an opposite side elevational view of the circuit board shown in FIG. 19 displaying the terminal connectors.

A detailed view of the front and back sides of the circular circuit board 146 are shown in FIGS. 19 and 20, respectively. The circuit board 146 is printed with four (4) electrical conductors 182a,b,c,d electrically connecting the contact brushes 148a,b,c,d to terminals 184a,b,c,d, respectively. The terminals 84a,b,c,d are electrically connected to eyelet terminals 186a,b,c,d on the back of the circuit board 146. The eyelet terminals 186a,b,c,d extend through the thickness of the circuit board 146 and are solder to the terminals 184a,b,c,d. The electrically insulated wires 166a,b,c,d of the electrical cord 164 are soldered into the eyelet terminals 186a,b,c,d, respectively.

Figure 21:
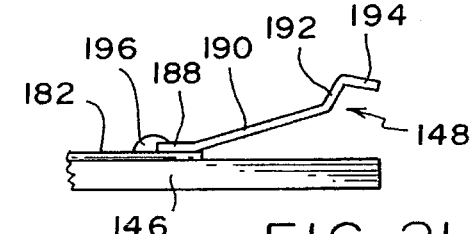
FIG. 21 is a detailed edge view of the circuit board shown in FIG. 20 revealing details of construction of one brush connector.

A detailed view of a brush contact 148 utilized in the embodiments of the present invention is shown in FIG. 21. The brush contact 148 is preferably made of beryllium copper and comprises a flat section 188, a bent up section 190, a further bent up section 192 and a bent downward section 194. The brush contact 148 is attached to the trace or conductor 182 by solder 196. The brush contact 148 is a cantilever type member which allows the section 194 to move upwardly and downwardly to compensate for any dimensional variation between the brush contact 148 and the corresponding electrically conductive ring 174 on the circuit board 136. This arrangement maintains the brush contact 148 in constant contact with the ring 174 of the circuit board 136 during relative rotation between the circuit boards 136 and 146 during winding or unwinding. The combination of the structural arrangement and composition of the brush contact 148 and the composition of the electrically conductive ring 174 minimize background noise in the signal being transferred through the contact arrangement.

Figure 22:
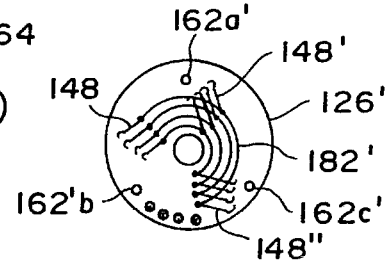
FIG. 22 is a side elevational view of another embodiment of the circuit board having plural (e.g. three) sets of brush contacts.

In preferred embodiments, additional sets of brush contacts 148 are provided such as one or two additional sets. For example, three sets of brush contacts 148, 148', 148" set at 120° increments about the circular circuit board 136' are provided in the embodiment shown in FIG. 22. Each individual brush contact of each set is connected in a parallel connection arrangement so that at least one of the brush contacts of the three sets remains in contact with the other circuit board 136 to ensure a good signal during winding and unwinding of the device.

Figure 23:
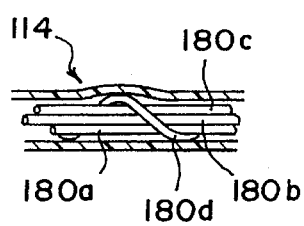
FIG. 23 is lengthwise cross-sectional view of the retractable electrical cord revealing the construction of a bundle of three (3) wires wrapped by one (1) additional wire.
Figures 24, 25:
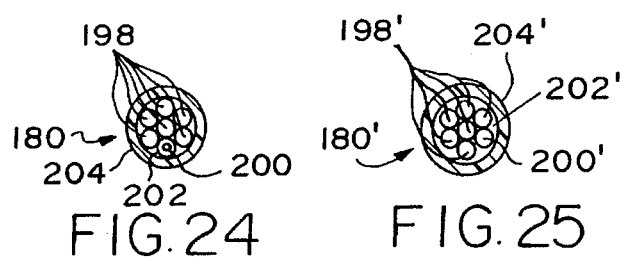
FIG. 24 is a detailed transverse cross-sectional view of the retractable electrical cord.
FIG. 25 is a detailed transverse cross-sectional view of another embodiment of the retractable electrical cord.

The retractable cord 114 comprises three (3) electrically insulated wires 180a,b,c, in a straight configuration wrapped with an electrically insulated wire 180d, as shown in FIG. 23. The bundles of wire are encased in a tubular insulating jacket 196. The electrically insulated wires 180a,b,c,d are each constructed of seven (7) strands of wire, preferably with six (6) copper strands 198 and one (1) stainless steel strand 200 coated with a copper layer 202. The strands are twisted together and enclosed in a insulating jacket 204.

The embodiment of the invention shown in FIGS. 8–21 is configured for use for telephone and power transfer applications. Specifically, the male electrical terminals 108 and 116 are conventional telephone terminal connectors, however, they are also suitable for conventional 110 V or 115 V, 10 amp power transfer. However, the conventional female terminals and internal wires and terminals would need to be modified for use in power transmission.

Figure 26:
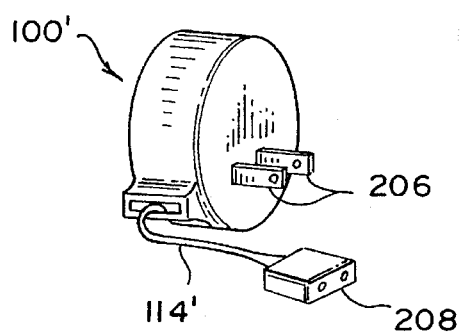
FIG. 26 is a perspective view of a retractable power cord extension device according to the present invention having a male UL connector.

An embodiment of the device 100' for application as a retractable extension cord is shown in FIG. 26. This embodiment is provided with a pair of electrical prongs 206 defining a UL plug for connection with a conventional UL outlet. The end of the retractable extension cord 114' is provided with a conventional UL female receptacle 208 for connection with a conventional UL male plug, as provided on most conventional household and business appliances.

Figure 27:
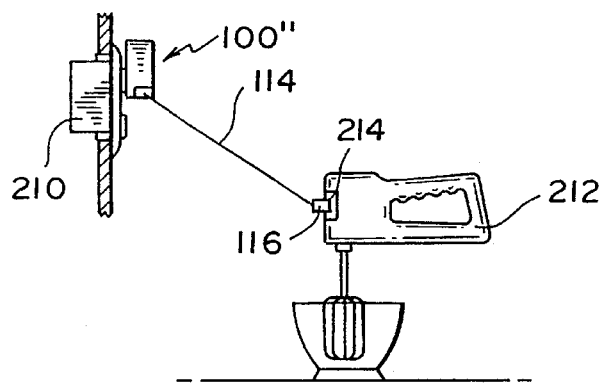
FIG. 27 is a schematic view of the retractable power cord extension device shown in FIG. 26 install on a conventional UL wall outlet and electrically connected to a hand held mixer with a telephone type male connector installed at the end of the retractable electrical cord.
Figure 28:
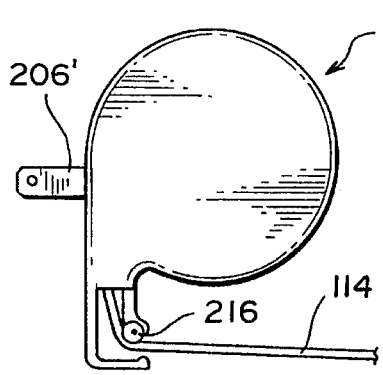
FIG. 28 is another embodiment of the retractable power cord extension device having a vertical orientation.

In the embodiment shown in FIG. 27, a device 100" similar to the type shown in FIG. 8 having a male electrical connector 116 defined by a conventional telephone male terminal is modified by replacing the male electrical connector 108 with electrical prongs defining a plug to allow connection with a conventional UL outlet 210. This embodiment can be used with a modified appliance such as a hand mixer 212 having a telephone type female terminal 212 for detachably connecting to the male electrical connector 116. The female terminal 212 is similar to a conventional telephone female type terminal, however, the connecting wires to the hand mixer 212 internally are heavier in gage than those of the conventional telephone female type terminal to safely handle power transmission. This arrangement eliminates the conventional cord of the hand mixer 212 allowing the mixer to be stored away without a cord attached thereto once disconnected from the device 100".

In a similar alternative arrangement, a device 100'" is provided with a set of electrical prongs 206' extending from a bottom portion of the device 100'". This configuration allows the device 100'" to be connected to a conventional UL receptacle in the orientation as shown to prevent the device from being inadvertently pulled out of the conventional UL receptacle when pulling out the retractable cord 114. A roller 216 is provided for changing the direction of the retractable cord 114 from vertical to horizontal as it is pulled out of the device 100'".

Figures 29, 30:
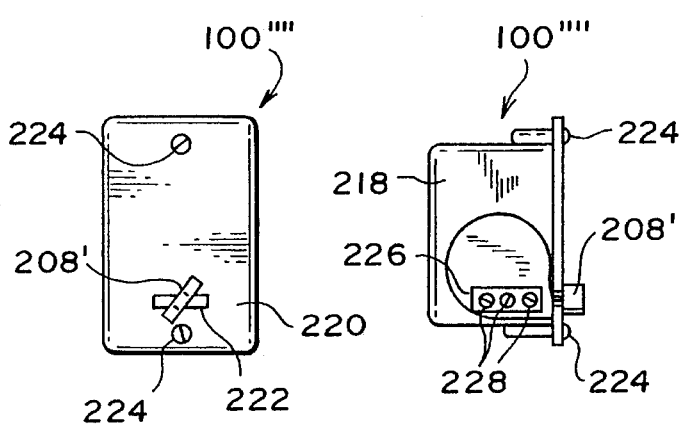
FIG. 29 is a front view of a further embodiment of the retractable power cord extension device defined by a UL wall outlet with the retractable electrical cord device according to the present invention installed therein.
FIG. 30 is a side view of the embodiment shown in FIG. 29.

A preferred wall mounted version of the device 100"" is shown in FIGS. 29 and 30. In this embodiment, a device the same as or similar to the device 100' shown in FIG. 26 is mounted within a UL type wall box unit. A cover plate 220 having a slot 222 is connected to the UL type wall box unit by fastening screws. The retractable cord of the device is pulled in and out through the slot 222 of the device 100"". This device 100"" is provided with a terminal 226 having three (3) screws for connecting a conventional UL three (3) wire cable having two power leads and a ground wire. Alternatively, this device can be modified with a suitable connector or terminal for telephone application instead of power transmission.

The above embodiments of the device can be used for power transmission and/or communication transmission applications. However, the retractable cord can be constructed to include both power transmission and communication transmission applications on the same or separate wire conductors.

Figure 31:
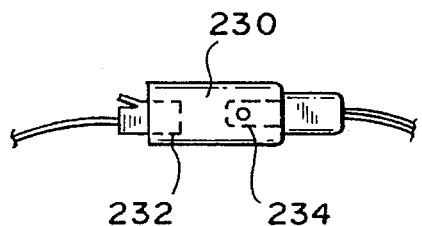
FIG. 31 is a side view of an electrical adapter for connecting together a male telephone type electrical terminal to a conventional UL male type connector.
Figure 32:
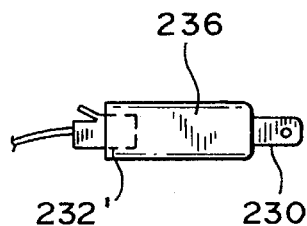
FIG. 32 is an electrical adapter provided with a male telephone type electrical terminal and a conventional UL male type connector.
Figure 33:
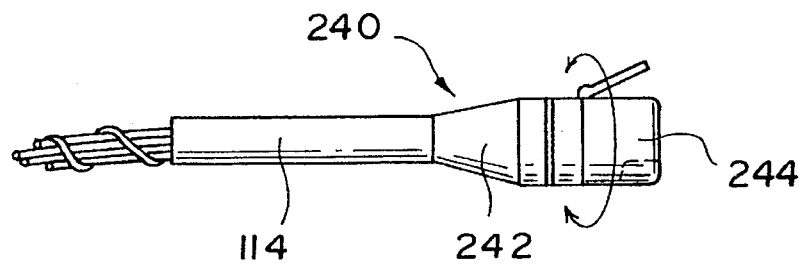
FIG. 33 is a swivel male connector for installation on the end of the retractable telephone cord to allow full 360 degree rotation.
Figures 34, 35:
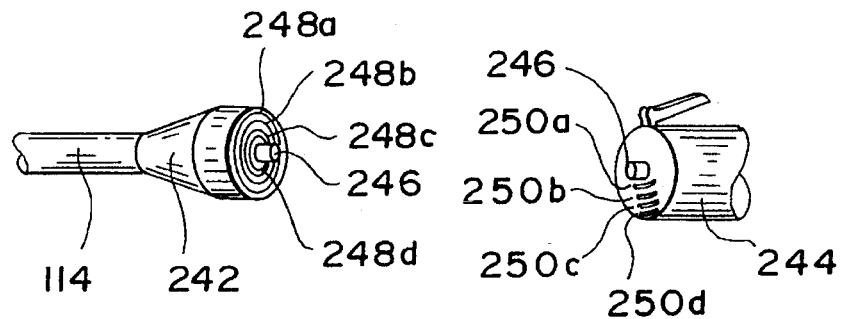
FIG. 34 is a perspective broken away view of the stationary portion of the swivable connector according to the present invention.
FIG. 35 is a broken away view of the moveable portion of the swivable connector according to the present invention.
Figure 36:
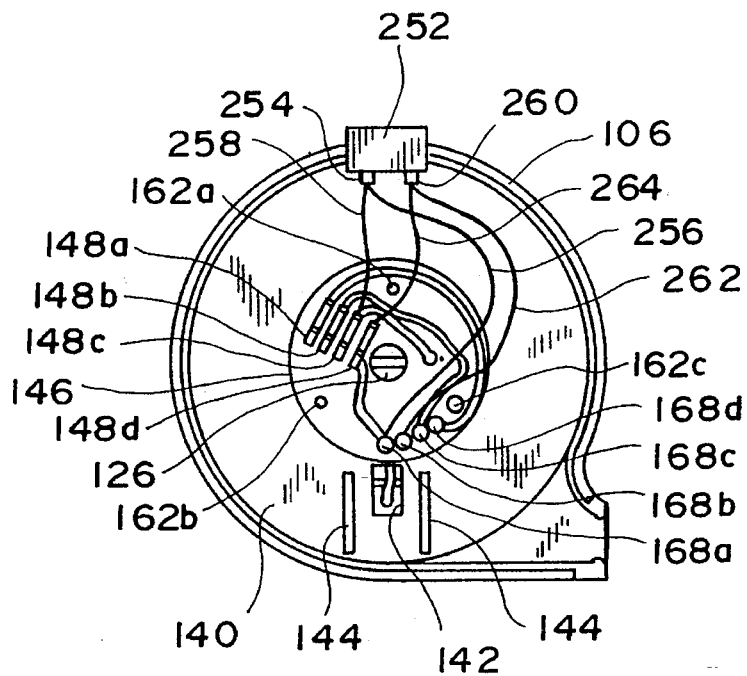
FIG. 36 is a side elevation view of a retractable power extension cord device according to the present invention with a fuse arrangement.
Figure 37:
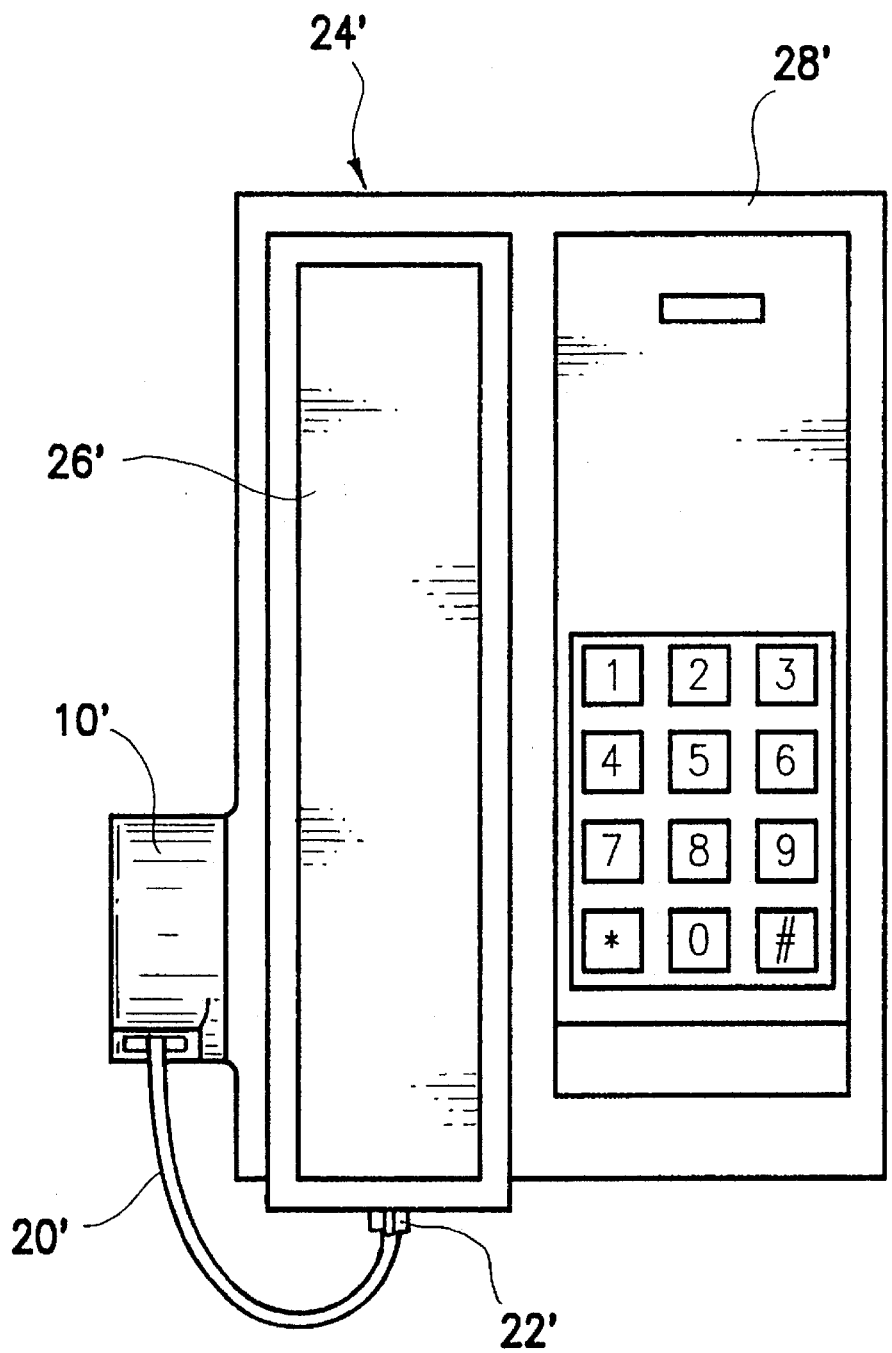
FIG. 37 is a top elevational view of a telephone provided with a telephone retractable cord device positioned in the housing of the base receiving unit according to the present invention.

The embodiments of the devices described above can be utilized with special adapters to connect to the male electrical terminals 108 and/or 116 (See FIG. 8), in the arrangements shown in FIGS. 31 and 32. The adapter 230 includes a telephone type female terminal 232 electrically connected to a UL type female receptacle 234, as shown in FIG. 31. The adapter 236 includes a telephone type female terminal 232' and male prongs 238 defining a UL type plug.

In another preferred embodiment, the retractable cord 114 is provided with a special swivable terminal connector 240 having a stationary portion 242 connected to the retractable cord 114, and a rotating portion 244. The rotating portion 244 is similar in construction to a conventional male telephone terminal. The arrangement allows the rotating portion 244 to freely rotate 360 degrees relative to the retractable cord 114 to further prevent the possibility of tangling thereof, while maintaining electrical contact.

The stationary portion 242 is provided with an axle 246 for rotatable connection with the rotating portion 244, and four conductive rings 248a,b,c,d. The rotating portion 244 is provided with a set of four (4) contact brushes 250a,b,c,d cooperating with conductive rings 248a,b,c,d, respectively, of the stationary portion 242. Alternatively, the conductive rings 248 and brush contacts can be reversed on the stationary portion 242 and rotating portion 244. The axle 246 can be fixed rigidly to one component and movably anchored (i.e. bearing arrangement) in the opposite component, or be anchored movably in both components.

In a preferred embodiment of the retractable power extension cord device, a fuse 252 is provided for safety purposes. The fuse 252 can be a conventional automotive type fuse with the housing side or sides molded to snuggle accommodate the fuse 252 in an upper portion of the housing. The fuse can be easily removed and replaced as necessary.

The fuse 252 includes a terminal 254 connected by wires 256 and 258 to terminal 168a and brush contact 148c, respectively, and a terminal 260 connected by wires 262 and 264 to the terminal 168b and brush contact 148d, respectively.

I claim:

1. A retractable electrical cord device for electrically connecting one electrical device to another electrical device, said device comprising:

a housing having an access opening;

a reel rotatably disposed within said housing;

a retractable electrical cord at least partially wound around said reel when stored, said retractable electrical cord having one end anchored to said reel and an opposite end extending through said access opening in said housing;

a first electrical connector extending through said housing for electrically connecting the retractable electrical cord device to the one electrical device;

a second electrical connector provided at said opposite end of said electrical cord for electrically connecting the retractable electrical cord device to the another electrical device;

a spring connected to said housing and said reel to provide means for retracting said electrical cord by winding said reel when said electrical cord is at least partially extracted from said housing; and a third electrical connector electrically connecting together said retractable electrical cord and said first electrical connector to accommodate relative rotational movement between said housing and said reel during winding and unwinding of said retractable electrical cord on and off said reel, said third electrical connector comprising a first printed circuit board having a plurality of concentric conductor rings, and a second printed circuit board rotationally aligned and having a plurality of electrical contacts for electrically connecting corresponding said conductor rings of said first printed circuit board, said retractable electrical cord electrically connected to one of the said first and second printed circuit boards, and said first electrical connector electrically connected to the other of said first and second printed circuit boards.

2. A device according to claim 1, wherein each electrical contact of said plurality of electrical contacts is defined by a bent metal cantilever spring connected at one end to said second printed circuit board providing an arrangement allowing a free end of said spring to float while being biased against a corresponding conductor ring of said first printed circuit board.

3. A device according to claim 1, wherein said conductor rings are each defined by a layer of nickel deposited on said first printed circuit board and a layer of gold deposited on said layer of nickel.

4. A device according to claim 1, wherein said first and second printed circuit boards are substantially circular in shape, and are accommodated within a circular shaped cavity extending into one side of said reel.

5. A device according to claim 1, wherein one or more redundant sets of electrical contacts are provided on said second printed circuit board corresponding to said conductor rings provided on said first printed circuit board, and corresponding electrical contacts of each set of electrical contacts are electrically connected in series to ensure a continuous signal from each conductor ring to said corresponding electrical contacts.

6. A device according to claim 1, wherein said first electrical connector is support on an extension from a side of said housing to facilitate connection to the one electrical device.

7. A device according to claim 1, including a mechanical connection for connecting the device in a UL electrical utility wall outlet.

8. A device according to claim 1, wherein said first and second electrical connectors are UL type electrical connectors.

9. A device according to claim 1, wherein said first and said second electrical connectors are telephone type connectors.

10. A device according to claim 1, wherein said first printed circuit board is mechanically connected to said reel and electrically connected to said retractable electrical cord, and said second printed circuit board is mechanically connected to said housing and electrically connected to said first electrical connector.

11. A device according to claim 10, wherein said plurality of concentric conductor rings are formed on one surface of said first printed circuit board and said retractable electrical cord is connected to an opposite side of said first printed circuit board, and said plurality of electrical contacts extend from one surface of said second printed circuit board and said first electrical connector is connected to an opposite side of said second printed circuit board.

12. A device according to claim 1, wherein said spring is a spiral spring having an inner end connected to said housing and an outer end connected to said reel.

13. A device according to claim 12, wherein said reel is provided with a cavity, and said spiral spring is disposed within said cavity of said reel.

14. A device according to claim 1, wherein said reel is provided with a cavity, and said third electrical connector is disposed within said cavity of said reel to provide a compact arrangement.

15. A device according to 2, wherein said first printed circuit board is disposed and fixed within said cavity of said reel and electrically connected to the one end of said retractable cord, and said second printed circuit board is disposed adjacent said first printed circuit board and fixed to said housing to prevent rotation, and electrically connected to said first electrical connector.

16. A device according to claim 14, wherein said spring is a spiral spring having an inner end connected to said housing and an outer end connected to said reel, said reel is provided with said cavity located on one side of said reel and said reel is provided with another cavity located on an opposite side of said reel for accommodating said spiral spring.

17. A device according to claim 1, wherein said device is a retractable telephone cord device, said first electrical connector including a first telephone connector terminal and said second electrical connector including a second telephone connector terminal.

18. A device according to claim 17, including a standoff connected to said housing for mechanically connecting said device to a telephone component.

19. A device according to claim 18, wherein said standoff is part of said first electrical connector, and said first electrical connector both electrically and mechanically connects the device to a telephone component.

20. A retractable electrical cord device for electrically connecting one electrical device to another electrical device, said device comprising:

a housing having an access opening;

a reel rotatably disposed within said housing;

a retractable electrical cord at least partially wound around said reel when stored, said retractable electrical cord having one end anchored to said reel and an opposite end extending through said access opening in said housing;

a first electrical connector extending through said housing for electrically connecting the retractable electrical cord device to the one electrical device;

a second electrical connector provided at said opposite end of said electrical cord for electrically connecting the retractable electrical cord device to the another electrical device;

a spring connected to said housing and said reel to provide means for retracting said electrical cord by winding said reel when said electrical cord is at least partially extracted from said housing; and a set of printed circuit boards provided with at least one set of a conductor and a contact for electrically connecting said retractable electrical cord to said first electrical connector and accommodating relative rotational movement between said reel and said housing during winding and unwinding of said retractable electrical cord on and off said reel.

21. A retractable telephone cord device for electrically connecting a base receiver unit of a telephone to a handset or headset of the telephone, said device comprising:

a stand alone housing having an access opening;

a reel rotatably disposed within said housing;

a retractable electrical cord at least partially wound around said reel when stored, said retractable electrical cord having one end anchored to said reel and an opposite end extending through said access opening in said housing;

a first electrical connector for electrically connecting the retractable electrical telephone cord device to the base receiver unit of the telephone, said first electrical connector being defined a standoff provided with a male telephone connector, said standoff connected at one end to a side of said housing and located off-axis relative to an axis of rotation of said reel;

a second electrical connector provided at said opposite end of said retractable electrical cord for electrically connecting said retractable electrical telephone cord device to the handset or headset of the telephone;

a spring connected to said housing and said reel to provide means for retracting said electrical cord by winding said reel when said electrical cord is at least partially extracted from said housing; and a third electrical connector electrically connecting together said retractable electrical cord and said first electrical connector to accommodate relative rotational movement between said housing and said reel during winding and unwinding of said retractable electrical cord on and off said reel.

22. A device according to claim 21, wherein said standoff is releasably connected to said housing in a manner to allow an orientation of said standoff relative to said housing to be changed, and further wherein said second electrical connector comprises a second telephone connector terminal.

23. A device according to claim 21, wherein said third electrical connector, comprises:

a first printed circuit board having a plurality of concentric conductor rings; and a second printed circuit board having a plurality of electrical contacts for electrically connecting with respective conductor rings of said first print circuit board, said first printed circuit board and said second printed circuit board are aligned for relative rotation therebetween, and further wherein said retractable electrical cord is electrically connected to said conductor rings of said first printed circuit board, and said first electrical connector is electrically connected to said electrical contacts of said second printed circuit board.

24. A device according to claim 21, wherein said second electrical connector is a swivel telephone connector.

25. A telephone apparatus, comprising:

a base receiver unit;

a handset or headset; and a retractable telephone cord device electrically connecting together said base receiver unit and said handset or headset, said retractable telephone cord device mechanically and electrically connected to and positioned on a side of said base receiver unit, said retractable telephone cord device comprising:

a housing;

a reel rotatably disposed within said housing;

a retractable electrical cord at least partially wound around said reel when stored, said retractable electrical cord having one end anchored to said reel;

a spring connected to said housing and said reel to provide means for retracting said retractable electrical cord by winding said reel when said retractable electrical cord is at least partially extracted from said housing; and an electrical connector for accommodating relative rotation between said reel and at least one of said base receiver units and said handset, wherein said retractable telephone cord device is a portion of said base receiver unit, and said housing is a portion of a housing enclosing said base receiver unit.

26. A telephone device according to claim 25, wherein an opposite end of said retractable telephone cord is provided with a telephone connector for releasably connecting said retractable telephone cord to said handset or headset.

27. A telephone according to claim 25, wherein said telephone connector is a swivel telephone connector.

28. A telephone according to claim 25, wherein said retractable telephone cord is provided with a swivel telephone connector.

* * * * *

UNITED STATES PATENT AND TRADEMARK OFFICE
CERTIFICATE OF CORRECTION

PATENT NO.   : 5,590,749
DATED        : January 7, 1997
INVENTOR(S)  : Ronald D. WAGNER *et al.*

It is certified that error(s) appears in the above-identified patent and that said Letters Patent is hereby corrected as shown below:

On the title page: Item [75]

Inventors: change "Signal Hill" to --Long Beach, California--;

change "Stafford, both of Calif." to --Stafford, Virginia--.

Signed and Sealed this

Twenty-third Day of June, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.    : 5,590,749
DATED         : January 7, 1997
INVENTOR(S)   : Ronald D. WAGNER et al.

It is certified that error(s) appears in the above-identified patent and that said Letters Patent is hereby corrected as shown below:

Inventors: change "Signal Hill" to --Long Beach, California--;

change "Stafford, both of Calif." to --Stafford, Virginia--.

Signed and Sealed this

Thirtieth Day of June, 1998

*Attest:*

BRUCE LEHMAN

*Attesting Officer*     *Commissioner of Patents and Trademarks*